US005642514A

United States Patent [19]
Peckham

[11] Patent Number: 5,642,514
[45] Date of Patent: Jun. 24, 1997

[54] METHOD AND SYSTEM FOR CONSTRUCTING COMPACT EXECUTABLE FILES BY ELIMINATING REDUNDANT DEBUGGING STRINGS

[75] Inventor: Stephen Bailey Peckham, Austin, Tex.

[73] Assignee: International Business Machines Corporation, Armonk, N.Y.

[21] Appl. No.: 449,058

[22] Filed: May 24, 1995

[51] Int. Cl.⁶ .................................................. G06F 9/45
[52] U.S. Cl. ............................................. 395/708; 395/709
[58] Field of Search ....................................... 395/708, 709

[56] References Cited

U.S. PATENT DOCUMENTS

| | | | |
|---|---|---|---|
| 4,558,413 | 12/1985 | Schmidt et al. | 395/705 |
| 4,809,170 | 2/1989 | Leblang et al. | 395/703 |
| 5,175,856 | 12/1992 | Van Dyke et al. | 395/704 |
| 5,313,616 | 5/1994 | Cline et al. | 395/704 |
| 5,339,433 | 8/1994 | Frid-Nielsen | 395/705 |
| 5,339,435 | 8/1994 | Lubkin et al. | 395/701 |
| 5,488,727 | 1/1996 | Agrawal et al. | 395/709 |
| 5,555,412 | 9/1996 | Besaw et al. | 395/708 |

*Primary Examiner*—Kevin A. Kriess
*Assistant Examiner*—John Q. Chavis
*Attorney, Agent, or Firm*—Richard A. Henkler; Brian F. Russell; Andrew J. Dillon

[57] ABSTRACT

A method and system within a data processing system are disclosed which enable a number of object files to be linked together to construct a compact executable program. First, the number of object files to be linked together are identified. Each of the object files to be linked includes one or more debugging strings that define a variable type or associate a variable name with a variable type, where a selected variable type is uniquely specified within a particular object file utilizing a type identifier. Each type identifier within each of the number of object files is mapped to a corresponding universal type identifier that uniquely specifies a selected variable type within all of the number of object files. Debugging strings which are not repeated in any two of the number of object files are written to the compact executable program, thereby minimizing a number of debugging strings written to the compact executable program.

14 Claims, 9 Drawing Sheets

PRIOR ART

METHOD AND SYSTEM FOR CONSTRUCTING COMPACT EXECUTABLE FILES BY ELIMINATING REDUNDANT DEBUGGING STRINGS

BACKGROUND OF THE INVENTION

1. Technical Field

The present invention relates in general to a method and system for improved data processing and in particular to an improved method and system for linking object files to construct an executable file. Still more particularly, the present invention relates to an improved method and system for constructing a compact executable file by eliminating redundant debugging strings.

2. Description of the Related Art

When developing software, a programmer commonly utilizes a debugger to troubleshoot the program under design. A debugger is a program which enables the programmer to interactively step through an executable program one statement at a time, examining variable values, checking conditions, and setting break points. In order to utilize a debugger, the programmer compiles the source code of the program to be analyzed utilizing a compiler option that inserts debugging information into the resultant object files. The debugging information inserted into the object files enables the debugger to identify variable types utilized within the object files, thereby ensuring that the debugger correctly interprets variable formats within memory.

Figure 4:
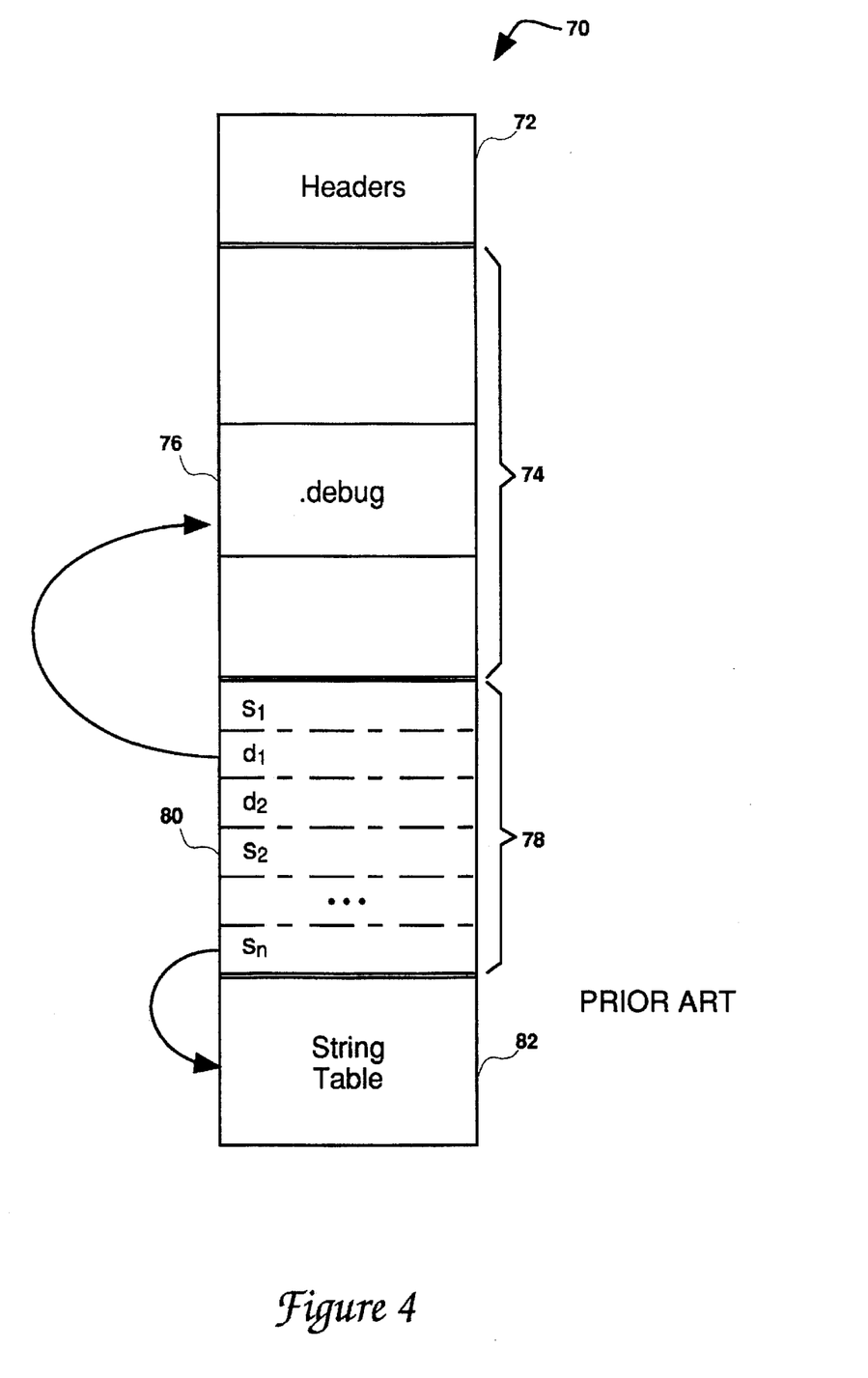
FIG. 4 depicts the conceptual structure of a conventional object file.

Referring now to FIG. 4, there is depicted the conceptual format of an object file utilized by the AIX operating system, the IBM version of UNIX. As illustrated, object file 70, like similar object files employed by other operating systems, comprises one or more headers 72 followed by program data sections 74, symbol table 78, and string table 82. Symbol table 78 includes a number of fixed-length entries 80 containing either linking symbols or debugging symbols. Linking symbols are required by the linker to resolve symbols when creating an executable program by linking object file 70 with other object files. Unlike linking symbols, debugging symbols, which are utilized by the debugger to ascertain the types and memory locations of variables, are generated only if the object file is compiled with a debugging option enabled. Because symbol table 80 stores only fixed-length information, if a symbol within an entry 80 describes variable-length information, the information associated with the symbol is placed in .debug section 76 if the symbol is a debugging symbol and in string table 82 if the symbol is a linking symbol. Entries 80 that refer to .debug section 76 or string table 82 contain an integer offset specifying the location of the variable-length information with respect to the beginning of its respective section.

The variable-length information associated with a particular entry 80 is stored within .debug section 76 as a character string called a stabstring (Symbol TABle STRING). Variable types utilized within object file 70 are specified within stabstrings by type numbers. Some variable types, such as integer, are predefined and are consistently specified within all object files utilizing unique negative type numbers (i.e., negative integers). Other variable types, however, which are defined with reference to predefined types or other defined types, are specified with arbitrary positive integers that can differ between object files. Thus, type 2 in one object file may or may not be of the same variable type as type 2 in another object file. Stabstrings can have one of two basic formats. A first variety of stabstrings defines a variable type by writing an integer followed by an equal sign and type definition. For example, the stabstring ":t2=*4" defines type 2 with reference to type 4. The second variety of stabstrings associates a symbol with a variable type. For example, the symbol X is associated with type 3 by the stabstring "X:3." As will be appreciated by those skilled in the art, not all integers appearing in a given stabstring represent variable types. Consequently, a stabstring must be parsed to determine if a particular integer within the stabstring specifies a variable type or merely indicates a length, an offset, or other data related to the associated symbol.

Figure 5:
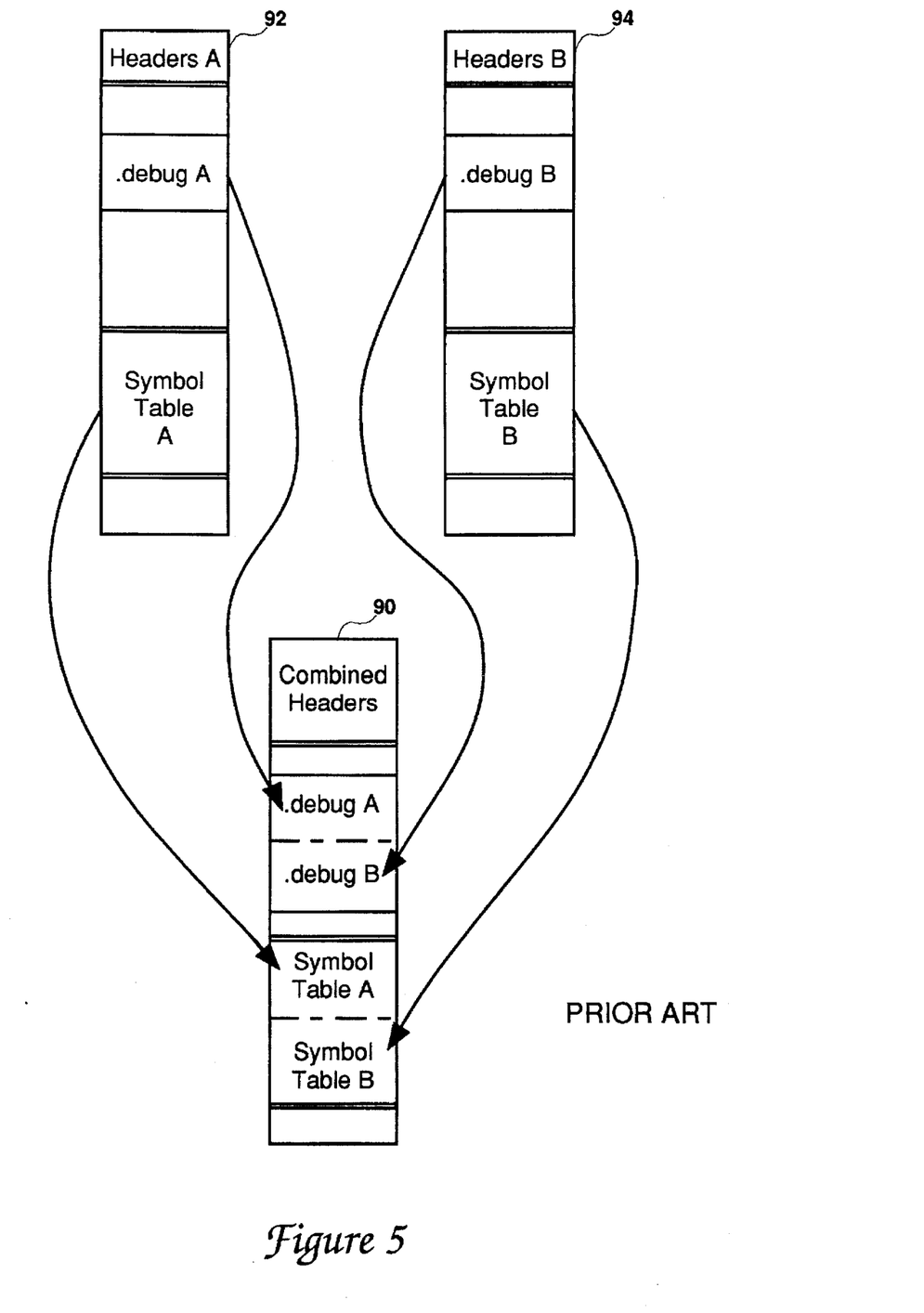
FIG. 5 is a diagram illustrating the construction of an executable program utilizing a conventional technique.

With reference now to FIG. 5, there is illustrated a conceptual view of the construction of executable file 90 from object files 92 and 94 according to a conventional method. As depicted, when object files 92 and 94 are linked, sections .debug A and .debug B within object files 92 and 94, respectively, are simply concatenated to form the .debug section of executable program 90. Thus, during a debugging session of executable program 90, debugging symbols within symbol table A would be defined with reference to stabstrings within .debug A and debugging symbols within symbol table B would be defined with reference to stabstrings within section debug B. Although the conventional method of linking object files 92 and 94 to construct executable program 90 is efficient when only linking time is considered, as the number of object files linked increases, the conventional technique of linking object files results in a large .debug section, and consequently, a large executable program 90. When the size of an executable program becomes large, debugger performance declines concomitantly for two reasons. First, if the executable program is stored on a remote file server, transferring a large executable program from the server to a local node is time consuming. In addition, increasing the size of the executable program increases the time that the debugger requires to read and interpret the stabstrings and can increase the number of memory page faults during execution, thereby decreasing performance.

In order to enhance debugging efficiency, some prior art systems have implemented additional processing while linking object files in order to reduce the size of the .debug section within the resulting executable program. For example, in some prior art system, variable types are specified by an arbitrary type number and a file name. By identifying and eliminating duplicate variable types which reference the same include file, the prior art systems decrease the number of stabstrings within the executable program. However, this technique of reducing the size of executable programs has a shortcoming in that identical variable types declared in different include files cannot be recognized as duplicates.

Consequently, it would be desirable to provide an improved method and system for reducing the size of executable programs by eliminating duplicate stabstrings.

SUMMARY OF THE INVENTION

It is therefore one object of the present invention to provide an improved method and system for data processing.

It is another object of the present invention to provide an improved method and system for linking object files to construct an executable program.

It is yet another object of the present invention to provide an improved method and system for constructing a compact executable program by eliminating duplicate debugging strings.

The foregoing objects are achieved as is now described. A method and system within a data processing system are disclosed which enable a number of object files to be linked together to construct a compact executable program. First, the number of object files to be linked together are identified. Each of the object files to be linked includes one or more strings that define a variable type or associate a variable name with a variable type, where a selected variable type is uniquely specified within a particular object file utilizing a type identifier. Each type identifier within each of the number of object files is mapped to a corresponding universal type identifier that uniquely specifies a selected variable type within all of the number of object files. Strings which are not repeated in any two of the number of object files are written to the compact executable program, thereby minimizing a number of strings written to the compact executable program.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
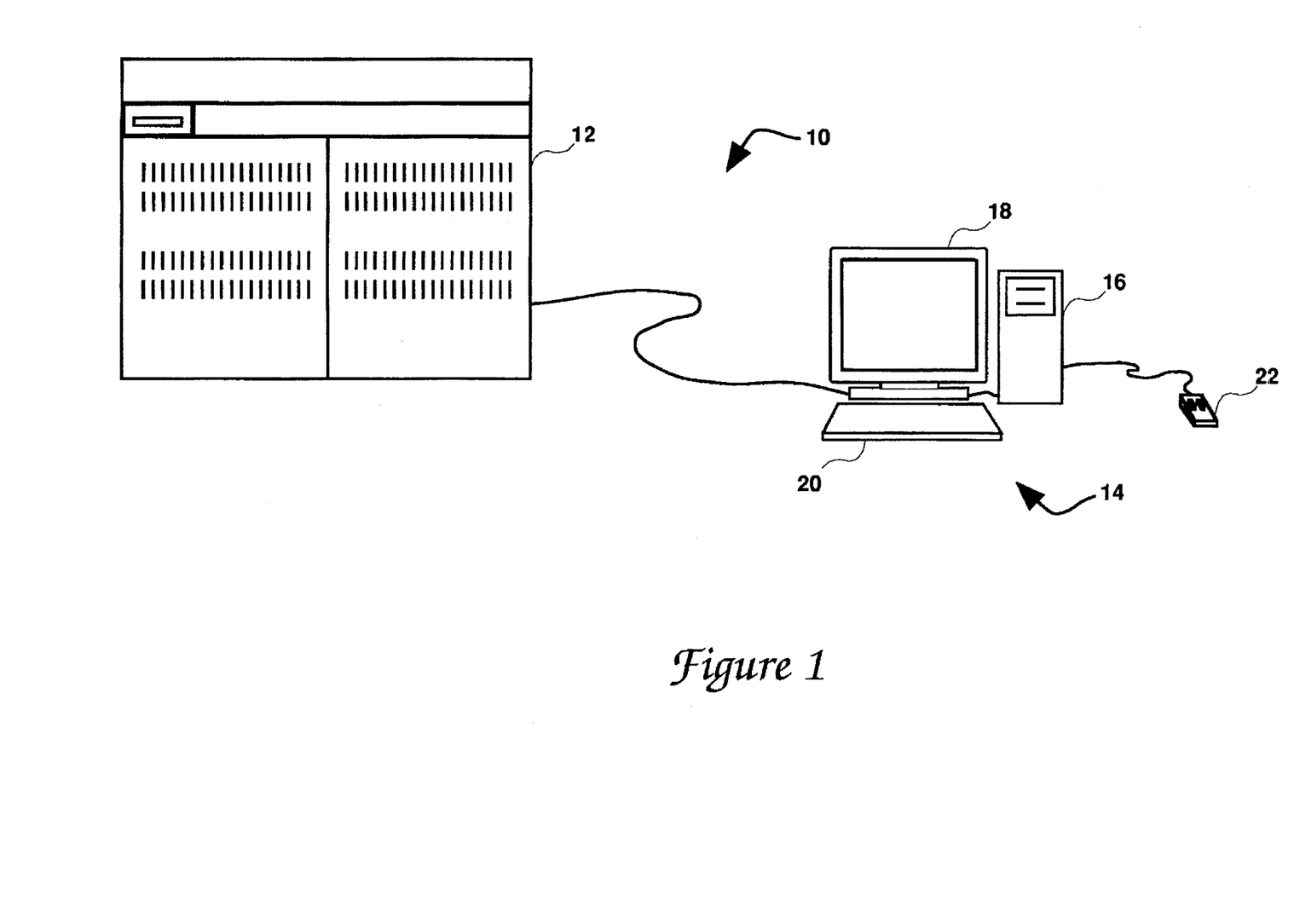
FIG. 1 illustrates a preferred embodiment of a data processing system which employs the method and system of the present invention.

With reference now to the figures and in particular with reference to FIG. 1, there is illustrated a preferred embodiment of a multiprocessor data processing system which employs the method and system of the present invention. As illustrated, data processing system 10 comprises system unit 12 and one or more local nodes 14, which include personal computer 16, display 18, keyboard 20, and mouse 22. As is well-known to those skilled in the art, a user inputs data to personal computer 16 utilizing keyboard 20, mouse 22 or other suitable input device. The user may then process the data locally utilizing personal computer 16, or transmit the data from personal computer 16 to system unit 12 or another node 14 utilizing well-known networking techniques. System unit 12 and personal computer 16 output data to a user via display device 18.

Figure 2:
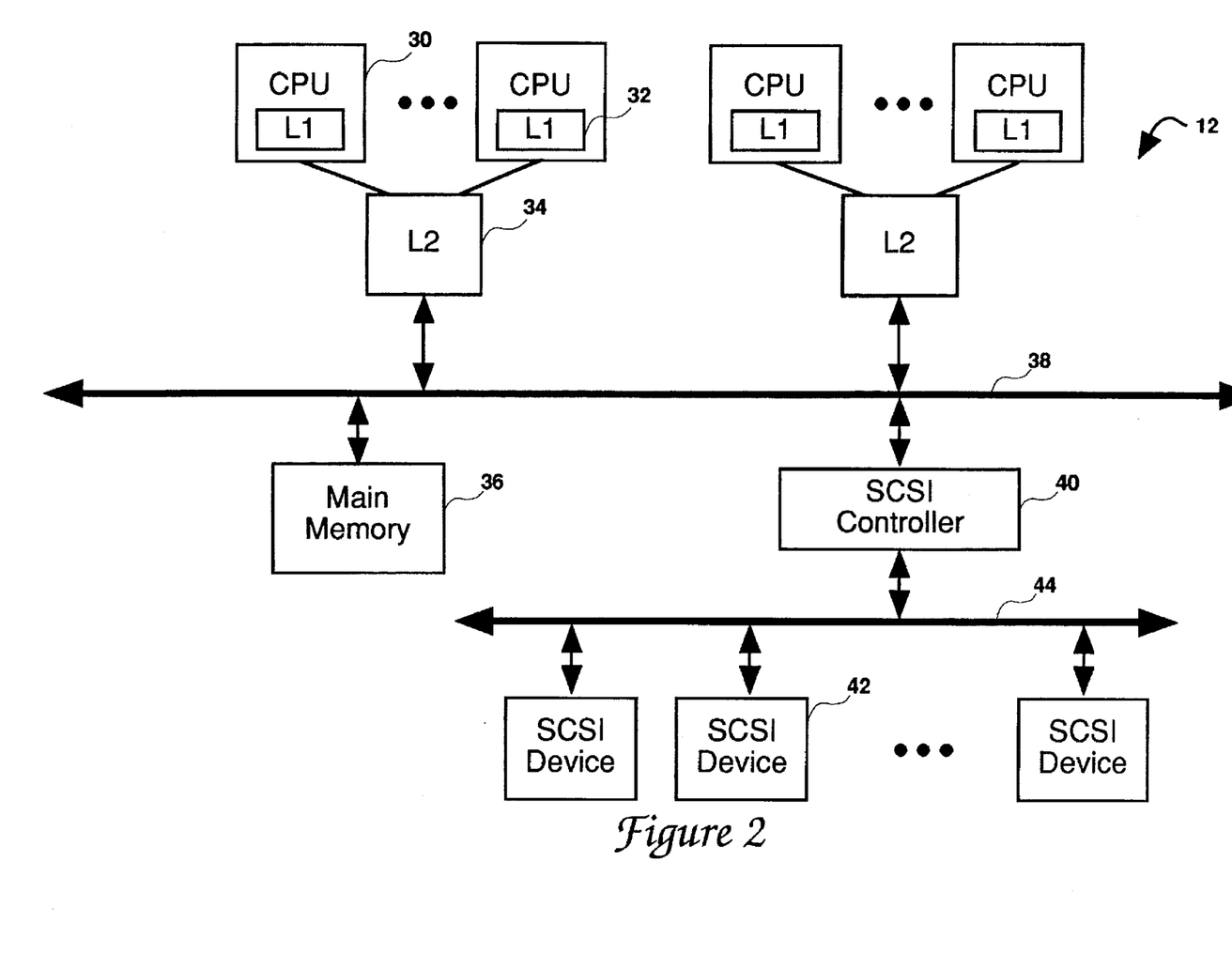
FIG. 2 depicts a preferred embodiment of the system unit of the data processing system illustrated in FIG. 1.

Referring now to FIG. 2, there is depicted a block diagram of system unit 12, which is preferably a superscalar multi-processor computer, such as the IBM RISC System/6000. System unit 12 includes a number of processors 30, which each include an on-board level 1 (L1) cache 32. In a preferred embodiment of the present invention, processors 30 comprise one of the PowerPC™ RISC microprocessors available from IBM. Each L1 cache 32 comprises a small amount of high speed memory which stores a local copy of data utilized by its associated processor 30. When data requested by a processor 30 is not resident within its associated L1 cache 32, processor 30 will attempt to load the requested data from an associated L2 cache 34 which comprises a second level within the memory hierarchy. As illustrated, each L2 cache 34 may be shared by multiple processors 30. When data requested by processor 30 is not resident within its associated L1 cache 32 or L2 cache 34, the data request is forwarded to main memory 36, which is accessible to each processor 30 via bus 38. As will be understood by those skilled in the art, main memory 36 may include one or more individual modules of physical memory as well as secondary storage, such as a DASD file. System unit 12 also includes SCSI controller 40, which enables additional SCSI devices 42 to be coupled to system unit 12 via expansion bus 44. As will be understood by those skilled in the art, system unit 12 includes additional devices (not illustrated) to support communication between system unit 12 and each of nodes 14.

Operation of system unit 12 is controlled by a suitable operating system program such as AIX. The operating system is a background program which provides an application programming interface (API) for use by debuggers and other application software.

Figure 3:
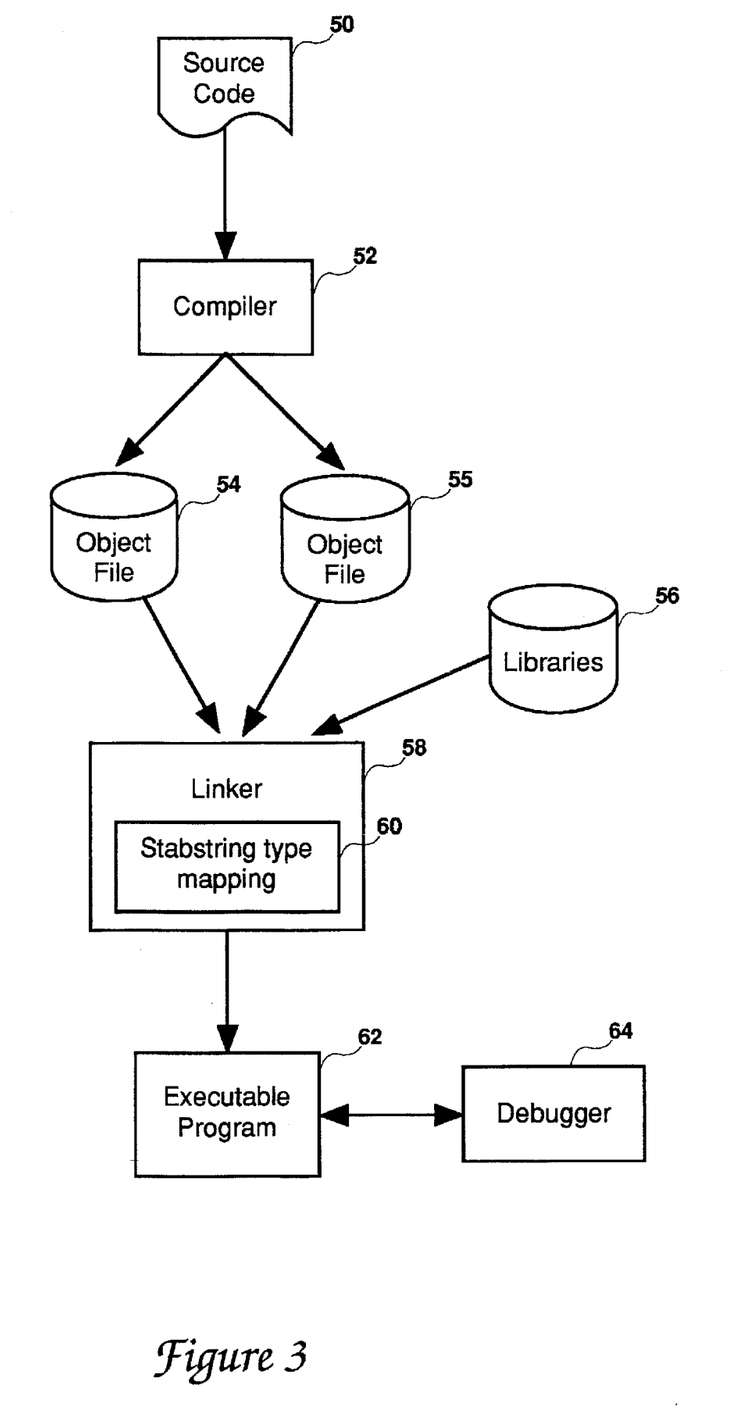
FIG. 3 is a process flow diagram illustrating the construction of an executable program according to the present invention.

With reference now to FIG. 3, there is illustrated a process flow diagram of the construction of an executable program utilizing system unit 12. A user initiates construction of executable program 62 by compiling source code 50, which resides at one of nodes 14 or within main memory 36, utilizing compiler 52. As will be understood by those skilled in the art, compiler 52 is a software program executed by CPUs 30 that translates source code 50 from a high-level language, such as C++, into object code. The resultant object files 54-55 produced by compiler 52 are then stored either at one of nodes 14 or within main memory 36.

Figure 6:
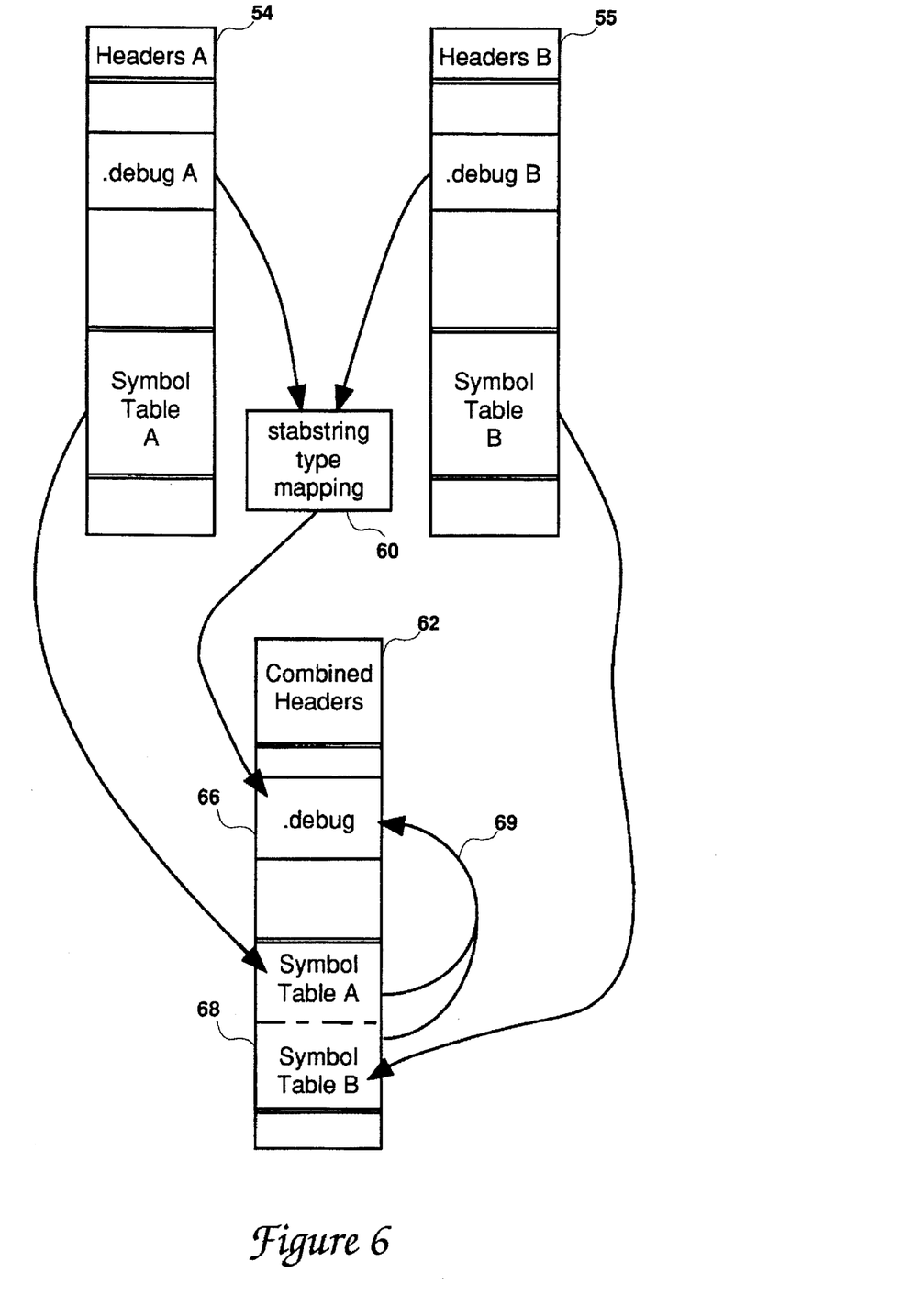
FIG. 6 is a diagram depicting the linking of two object files to construct an executable program according to the present invention.

Thereafter, object files 54-55 are linked by linker 58 with precompiled routines stored as libraries 56. Libraries 56 include routines, such as basic input/output, etc., which may be utilized by a wide variety of executable programs 62. According to the present invention, linker 58 includes stabstring type mapping routine 60, which reduces the size of executable program 62 by eliminating redundant stabstrings from executable program 62. Stabstring type mapping routine 60 recognizes redundant stabstrings by mapping variable type numbers utilized within each object file to a single set of universal type numbers. Referring now to FIG. 6, there is depicted a conceptual view of the operation of stabstring type mapping routine 60. As illustrated, stabstring type mapping routine 60 reduces the size of .debug section 66 of executable program 62 by eliminating stabstrings duplicated in the .debug sections of object files 54-55. Because duplicate stabstrings are eliminated from .debug section 66, debugging symbols within the symbol table A and symbol table B portions of symbol table 68 can refer to a single stabstring within .debug section 66, as is indicated by arrow 69.

Returning to FIG. 3, after object files 54-55 are linked together with libraries 56 to form executable program 62, executable program 62 can be debugged utilizing debugger 64. Because the size of executable program 62 is reduced by eliminating redundant instances of stabstrings from the .debug section of executable program 62, the performance of debugger 64 is greatly enhanced.

Figure 7A:
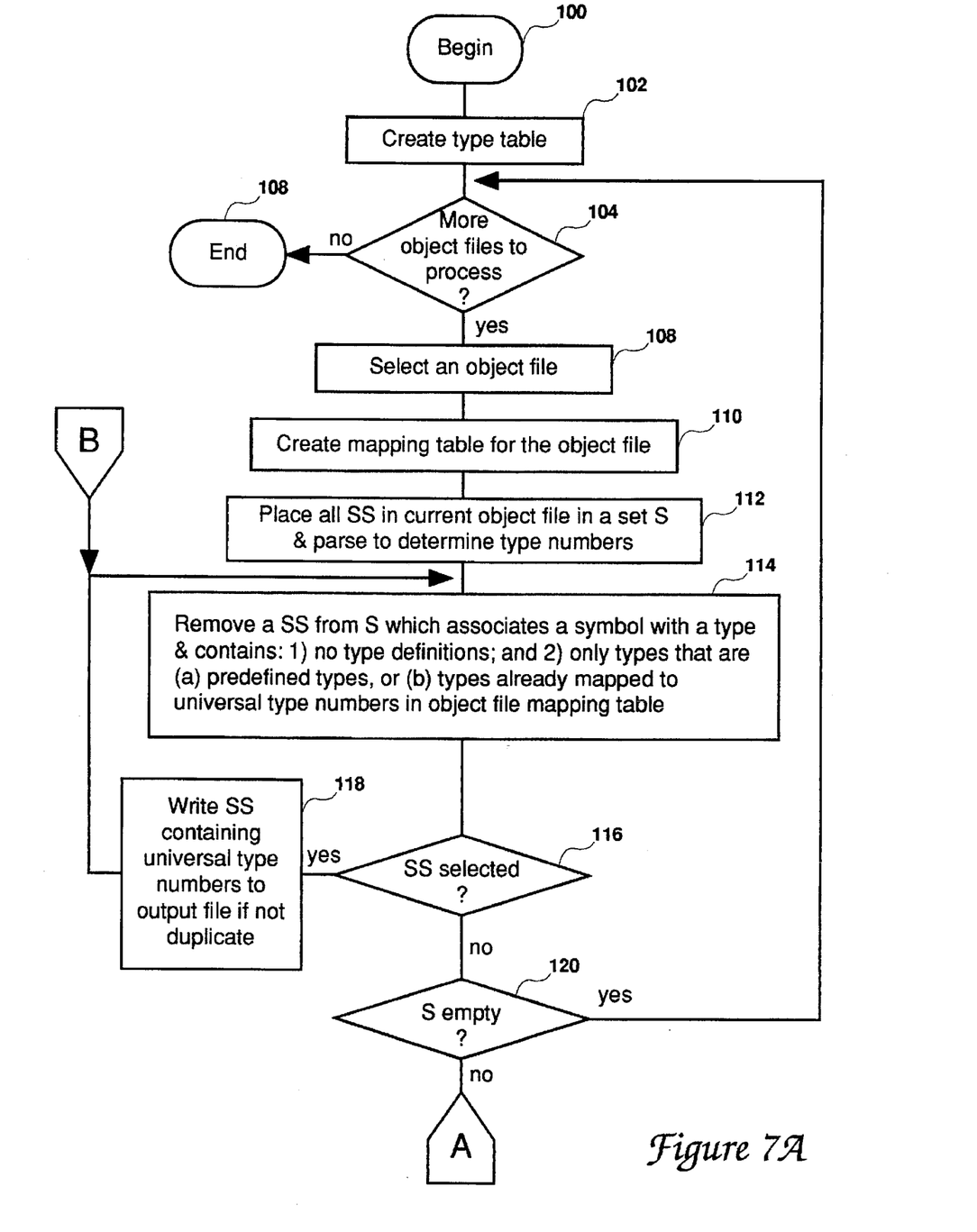
FIGS. 7A-7C together comprise a flowchart illustrating construction of a compact executable program according to the method of the present invention.
Figure 7B:
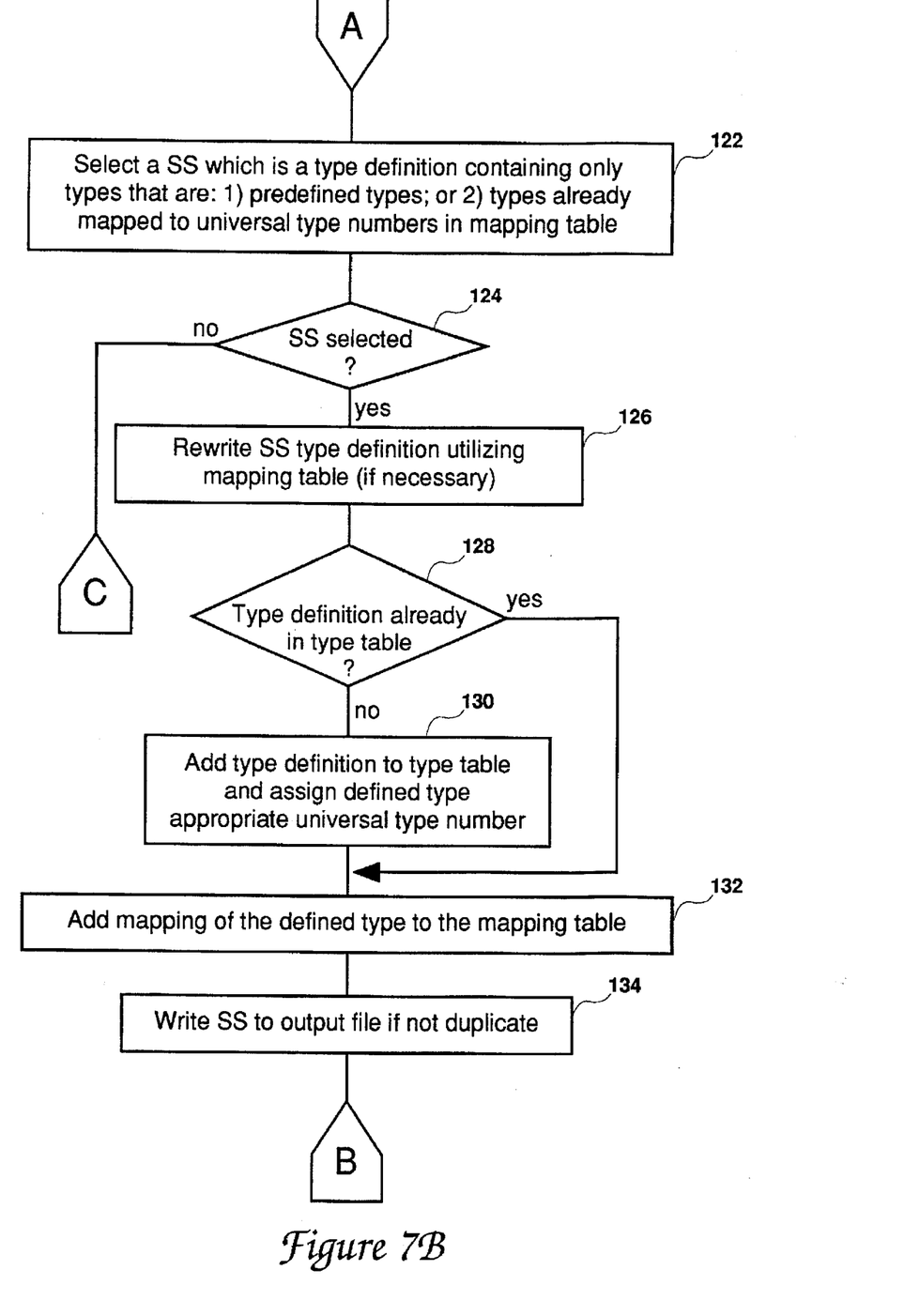
Figure 7C:
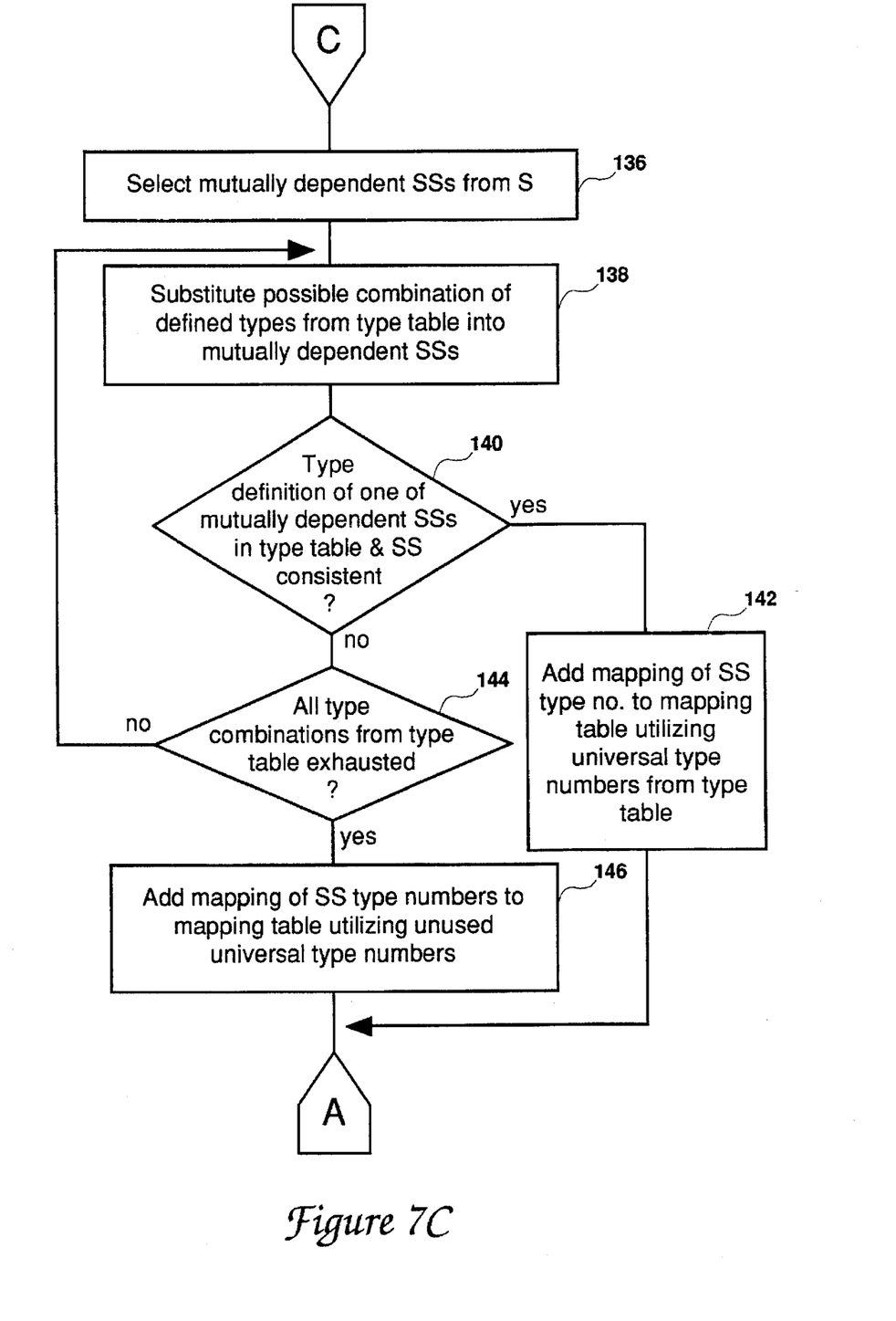

With reference now to FIGS. 7A-7C, there is illustrated a flowchart of the process utilized by stabstring type mapping routine 60 to eliminate redundant instances of stabstrings when constructing the .debug section of executable program 62. Referring first to FIG. 7A, the process begins at block 100 and thereafter proceeds to block 102, which depicts creating a type table. As illustrated in Table 1, for example, the type table comprises a number of entries which store a universal type number in association with a character string that defines the universal type number with reference to either a predefined variable type or another universal variable type. Thus, in contrast to object files 54 and 55, which each utilize arbitrary numbers to designate distinct variable types, executable program 62 utilizes a single set of universal type numbers to identify variable types within the debug section of executable program 62. As will become apparent, utilizing a single set of universal type numbers within all stabstrings within the .debug section of executable program 62 enables redundant stabstrings to be identified and eliminated, thereby decreasing the overall size of executable program 62.

TABLE 1

| UNIVERSAL TYPE NUMBER | UNIVERSAL TYPE DEFINITION |
| --- | --- |
| 2 | *-2 |
| 3 | s8a:-1, 0, 32; b:3, 32, 32;; |

Next, at block 104, a determination is made whether linker 58 has additional object files to process. If linker 58 has processed all object files, the process proceeds to block 106, where the process terminates. However, if additional object files remain to be processed, the process proceeds to block 108, which depicts selecting a next object file to process. Then, at block 110, a mapping table associated with the selected object file is created. The mapping table stores mappings between the type numbers utilized within the selected object file and universal type numbers. Since the type numbers arbitrarily assigned to variable types differ between object files, the present invention utilizes a separate mapping table for each of the object files processed.

Thereafter, the process proceeds to block 112, which illustrates placing all of the stabstrings within the current object file in a set S and parsing the stabstrings to determine which of the integers within the stabstrings specify variable types. As described above, the .debug section of the current object file can contain stabstrings having one of two formats. The first stabstring format associates a symbol with a variable type and has the general format "X:3," where the symbol X is associated with variable type 3. The second stabstring format defines a variable type with reference to other predefined or previously defined variable types. These stabstrings have the general format ":t2=s8b: -1, 0, 32; f:7, 32, 32;;". In this example, variable type 2 is being defined with reference to variable types -1 and 7. The remaining integers within the stabstring are lengths or offsets within the variable type being defined. In a preferred embodiment of the present invention, after the stabstrings are placed within the set S and parsed, the stabstrings are sorted topologically such that each stabstring within S depends on variable types defined in preceding stabstrings.

The process then proceeds to block 114, which depicts identifying and removing from S a stabstring that associates a symbol with a variable type and contains no variable type definitions and only predefined variable types or variable types already mapped to universal type numbers within the mapping table. If a stabstring within S meets these criteria, the process proceeds through block 116 to block 118, which illustrates writing the selected stabstring to the .debug section of the executable program if the stabstring does not duplicate another stabstring already within the .debug section. The stabstring written to the .debug section contains only predefined type numbers or universal type numbers from the mapping table which correspond to the type numbers utilized within the original stabstring. The process returns from block 118 to block 114, where another stabstring is selected. If, however, no stabstring can be selected at block 114, the process proceeds from block 114 through block 116 to block 120, which depicts determining if S is empty. If S is empty, the process returns to block 104, which depicts determining if additional object files remain to be processed.

If at block 120 a determination is made that S is not empty, the process proceeds from block 120 of FIG. 7A to block 122 of FIG. 7B, which depicts selecting a stabstring from S which defines a variable type with reference to only predefined variable types or variable types which are mapped to universal type numbers within the mapping table. If a stabstring cannot be selected at block 122, the process proceeds through block 124 to block 136 of FIG. 7C. However, if a stabstring can be selected at block 122, the process proceeds through block 124 to block 126, which depicts rewriting the type definition portion of the selected stabstring utilizing universal type numbers from the mapping table (if the stabstring is not defined wholly in reference to predefined types).

Next, at block 128, a determination is made whether the type definition rewritten at block 126 is stored within the type table. If the type definition is stored within the type table, the process proceeds to block 132. If, however, the type definition is not already stored within the type table, the type definition is stored within the type table and assigned a universal type number at block 130. In a preferred embodiment of the present invention, universal type numbers are assigned sequentially beginning with 2, with universal type number 1 reserved for errors. The process then proceeds to block 132, which depicts storing the mapping between the universal type number assigned to the type definition and the type number utilized within the object file to the mapping table. Thereafter, at block 134, the rewritten stabstring is stored within the .debug section of the executable program if the stabstring is not a duplicate of a previously stored stabstring. The process then returns to block 114 of FIG. 7A.

Returning to block 124 of FIG. 7B, if a stabstring containing a type definition which defines a type with reference only to predefined types or types stored within the mapping table cannot be selected from S, the process proceeds to block 136 of FIG. 7C. When the process reaches block 136, S contains two or more stabstrings which are mutually dependent, that is, each of the mutually dependent stabstrings is defined with reference to variable types defined by others of the mutually dependent stabstrings. The process selects the mutually dependent stabstrings at block 136 and then proceeds to blocks 138-144, which depict iteratively substituting combinations of defined universal types from the type table into the mutually dependent stabstrings to determine if one of the mutually dependent stabstrings duplicates a type definition stored within the type table. Once a particular combination of universal types is substituted from the type table into the mutually dependent stabstrings at block 138, a determination is made at block 140 whether one of the mutually dependent stabstrings matches a type definition within the type table and whether the particular substituted combination of universal types results in a consistent mapping of types within all of the mutually dependent stabstrings. If the conditions of block 140 are not met, a determination is made at block 144 if all combinations of universal types have been exhausted. If not, the process proceeds from block 144 to block 138, which illustrates substituting another combination of universal types into the mutually dependent stabstrings. However, if all combinations of universal types are exhausted before a match is found between one of the mutually dependent stabstrings and a type definition within the type table, the process proceeds to block 146 which depicts arbitrarily assigning unused universal type numbers to the variable types within the mutually dependent stabstrings and storing the mappings between the universal type numbers and the object file type numbers in the mapping table.

Returning to block 140, if substituting a particular combination of universal types from the type table into the mutually dependent stabstrings causes one of the mutually dependent stabstrings to match a type definition within the type table and results in a consistent mapping for all of the mutually dependent stabstrings, the process proceeds to block 142, which illustrates storing the mapping between the object file's type numbers and the universal type numbers in the mapping table. The process then proceeds from either block 142 or block 146 to block 122 of FIG. 7B.

As will be appreciated by those skilled in the art, the time required to perform the iterative substitution depicted at blocks 138–144 increases dramatically as the number of type definitions within the type table increases. As a matter of design choice, the resolution of variable types within the mutually dependent stabstrings can be simplified by proceeding from block 136 to block 146 without performing the iterative matching algorithm illustrated by blocks 138–144. Although simply assigning arbitrary universal type numbers to variable types within mutually dependent stabstrings increases the efficiency of linking the object files, the increased linking efficiency is achieved at the expense of possibly leaving redundant stabstrings within the .debug section of executable program 62.

The operation of the process depicted in FIGS. 7A–7C will now be described with reference to an example in which two object files are linked to create an executable program. Assume object file 54 contains the stabstrings:

1. c:t2=s8a: −1, 0, 32; b: 3, 32, 32;;
2. :t3=*2
3. X:3
4. :t4=*−1
5. Y:4

In addition, assume that object file 55 contains the stabstrings:

1. c:t11=s8a: −1, 0, 32; b: 12, 32, 32;;
2. :t12=*11
3. X:12
4. :t6=*−1
5. Y:6
6. c:t19=s8a: −1, 0, 32; b:21, 32, 32;;
7. :t20=*19
8. :t21=*20
9. Z:21

Referring first to FIG. 7A, after a type table is created at block 102, assume object file 54 is selected at block 108. Then, at blocks 110 and 112, a mapping table associated with object file 54 is created and the stabstrings within object file 54 are placed within a set S. After parsing stabstrings 1–5, it is apparent that none of the stabstrings within S can be selected at block 114 since none of the stabstrings which associate a symbol with a type contain only predefined types or types mapped to universal type numbers within the mapping table. Since no stabstrings can be selected and S is not empty, the process proceeds to block 122, which illustrates selecting a stabstring from S which defines a type with reference to only predefined types or types already mapped to universal type numbers within the mapping table. At block 122 stabstring 4 is selected since it defines type 4 in terms of a predefined type (i.e., a negative type number). Since stabstring 4 defines a type with reference to only predefined types, the stabstring is not rewritten at block 126. Then, at block 128 a determination if made whether the definition ":*−1" is already stored within the type table. Since the definition is not stored within the type table, the definition "*−1" is stored in the type table in association with universal type number 2. In addition, the mapping 4→2 is added to the mapping table at block 132. The stabstring ":t2=*−1" is then written to .debug section 66 of executable program 62. Thereafter, the process returns to block 114.

At block 114, since variable type 4 is mapped to universal type number 2, stabstring 5 is selected. At block 118, stabstring 5 is written to the output file as "Y:2." Since another stabstring cannot be selected at block 114, the process proceeds to block 122. However, since none of the stabstrings within S define a type with reference to only predefined types or types mapped to universal types, the process proceeds through block 124 to block 136 of FIG. 7C.

At block 136, stabstrings 1 and 2 are selected since they are mutually dependent. Since the definition within the type table does not match either stabstring, the arbitrary mappings 2→3 and 3→4 are assigned at block 146. Thereafter, the process returns to block 122 of FIG. 7B, where stabstrings 1 and 2 are again selected. The process proceeds from block 122 through block 124 to block 126, which depicts rewriting stabstrings one and two utilizing the mappings assigned at block 146. Then, at block 128, a determination is made that the type definitions are not stored in the type table. Therefore, at block 130 universal type number 3 is stored within the type table in association with the type definition "s8a:−1, 0, 32; b:4, 32, 32;;" and universal type number 4 is stored in the type table in association with the definition "*3." Since the mapping of the universal type numbers 3 and 4 is already stored within the mapping table, the mappings are not duplicated at block 132. Then, the process proceeds to block 134, which depicts writing rewritten stabstrings 1 and 2 to .debug section 66 of executable file 62.

Returning to block 114 of FIG. 7A, the remaining stabstring, stabstring 3, is selected. Since the mapping table contains the mapping 3→4, stabstring 3 is written to the output file at block 118 as "X:4." Since no more stabstrings remain in S, the process proceeds from block 118 through blocks 114, 116, and 120 to block 104, which illustrates determining if additional object files remain to be processed. Since object file 55 has not been processed, the process then proceeds to block 108, which illustrates selecting object file 55.

The process proceeds from block 108 to block 110, which depicts creating a new mapping table associated with object file 55. Then, all of the stabstrings within object file 55 are placed in set S and parsed at block 112. Since none of stabstrings 1–9 can initially be selected at block 114, the process proceeds to block 122, where stabstring 4 is selected since it defines a variable type with reference to a predefined type. The process then proceeds through block 124 to block 126. Since stabstring 4 defines a variable type only in reference to a predefined type, stabstring 4 does not need to be rewritten at block 126. Next, a determination is made at block 128 whether the definition "*−1" is already stored within the type table. Since the definition "*−1" is was stored within the type table during the processing of object file 54, the process proceeds to block 132, which illustrates adding the mapping 6→2 to the mapping table associated with object file 55. However, since the stabstring ":t2=*−1" has already been written to a output file, stabstring 4 is redundant and not written to executable program 62 at block 134.

The process then returns from block 134 of FIG. 7B to block 114 of FIG. 7A, where stabstring 5 is selected since it defines a variable type with reference to type 6 which is stored in the mapping table. However, since the stabstring "Y:2" has already been written to the output file, stabstring 5 is not written to the output file at block 118.

Thereafter, since a stabstring cannot be selected from S at either of blocks 114 or 122, the process proceeds to block 136, where mutually dependent stabstrings 1 and 2 are selected. At blocks 138–144, a determination is made that the mappings 11→3 and 12→4 cause the variable types defined in stabstrings 1 and 2 to match definitions stored within the type table while processing object file 54. Thus, at block 142, the mappings 11→3 and 12→4 are stored in the mapping table. The process then proceeds to block 122, where stabstrings I and 2 are again selected and subsequently rewritten at block 126. However, since the rewritten stabstrings already are stored within the output file, the stabstrings are not written to the output file at block 134. The process then returns to block 114.

At block 114, stabstring 3 is selected. However, since rewritten stabstring 3 already exists within the output file, stabstring 3 is not written to the output file at block 118.

Since no remaining stabstrings can be selected at either blocks 114 or 122, the process proceeds to block 136, where mutually dependent stabstrings 6, 7, and 8 are selected. The process proceeds to blocks 138–144, which attempt to locate a particular combination of universal types to substitute into stabstrings 6, 7, and 8 which would cause one of the mutually dependent stabstrings to match a type definition stored within the type table. It appears initially that the mappings 19→3 and 21→4 can be selected for stabstring 6 to match one of the universal type definitions stored within the type table. However, these mappings will result in inconsistencies between the mutually dependent stabstrings since stabstring 7 would be rewritten as "*3," which has already been assigned to type number 4. Thus, it would be necessary to select the mapping 20→4, which conflicts with the mapping 21 →4. Since no suitable combination of universal type numbers exists, the process proceeds from blocks 138–144 to block 146, which depict assigning new mappings to stabstrings 6, 7 and 8 and storing the mappings in the mapping table. Therefore, the mappings 19→5, 21→6, and 20→7 are added to the mapping table. Thereafter, the remaining stabstrings within S can be processed and written to executable program 62. After all of the stabstrings within S have been processed, the process proceeds to block 104, where a determination is made that all object files have been processed. Thereafter, the process terminates at block 106.

The resulting .debug section 66 of executable program 62 contains the following stabstrings:
1. c:t3=s8a: −1, 0, 32; b:4, 32, 32;;
2. :t4=*3
3. X:4
4. :t2=−1
5. Y:2
6. c:t5=s8a:−1, 0, 32; b:6, 32, 32;;
7. :t7=*5
8. :t6=*7
9. Z:6

By employing the present invention while linking object files 54 and 55, duplicates of stabstrings 1–5 are eliminated, resulting in a compact .debug section 66 within executable program As has been described, the present invention provides a method and system for constructing compact executable programs by reducing the number of debugging strings within the executable program. Although the reduction in the number of debugging strings within the executable program is application-dependent, the size of the .debug section within an AIX executable program can be reduced to as little as one fourth of its original size, resulting in a twenty-five percent reduction in the total size of the executable program. Despite the additional linking time required when the present invention is employed, overall debugging efficiency is enhanced since the acceleration afforded the debugger when processing large programs is, in general, greater than the additional linking time required. The present invention is particularly advantageous when a user is debugging a large executable program incorporating object files stored within an AIX library. In general, a user debugging an executable program compiles and links the object files comprising the executable program following each revision of the executable program. Since AIX permits a user to store a collection of compiled and linked library object files as a so-called shared object, the variable type mapping of the present invention need only be performed on the library object files when creating the shared object rather than following each revision of the executable program. Consequently, the additional linking time attributable to employing the present invention is limited to the additional processing required for the object files that do not comprise the shared object.

While the invention has been particularly shown and described with reference to a preferred embodiment, it will be understood by those skilled in the art that various changes in form and detail may be made therein without departing from the spirit and scope of the invention.

What is claimed is:

1. A method within a data processing system for constructing a compact executable program, said method comprising:

identifying a plurality of object files to be linked together to construct said compact executable program, said plurality of object files each including one or more strings that define a variable type or associate a variable name with a variable type, wherein a selected variable type is uniquely specified within a particular object file utilizing a type identifier;

mapping each type identifier within each of said plurality of object files to a corresponding universal type identifier that uniquely specifies a selected variable type within all of said plurality of object files; and writing strings to said compact executable program which are not repeated in any two of said plurality of object files, wherein a number of strings written to said compact executable program is minimized.

2. The method for constructing a compact executable program of claim 1, wherein said steps of mapping and writing are performed for each of said plurality of object files individually.

3. The method for constructing a compact executable program of claim 2, wherein at least one variable type within one of said plurality of object files is a predefined variable type that is not defined in reference to other variable types within said one of said plurality of object files.

4. The method for constructing a compact executable program of claim 3, said data processing system having a plurality of mapping tables each associated with one of said plurality of object files, said plurality of mapping tables mapping type identifiers within an associated one of said plurality of object files to corresponding universal type identifiers, and a type table, wherein said type table stores a universal type identifier in association with a string that defines a variable type specified by that universal type identifier, wherein for a particular object file said step of mapping comprises:

determining if said particular object file includes a string having a first syntax, wherein said string having a first syntax associates a variable name with only predefined variable types or variable types specified by type identifiers stored within a mapping table associated with said particular object file;

in response to said determination that said particular object file includes a string having said first syntax, mapping to a corresponding universal type identifier each type identifier within said string having said first syntax;

repeating said step of determining if said particular object file includes a string having said first syntax;

in response to said determination that said particular object file does not include a string having said first syntax, determining if said particular object file includes a string having a second syntax, wherein said string having said second syntax defines a variable type with reference to only predefined variable types or variable types specified by type identifiers stored within said associated mapping table;

in response to said determination that said particular object file includes a string having said second syntax, mapping to a corresponding universal type identifier each type identifier within said string having said second syntax;

storing said string having said second syntax within said type table in association with a corresponding universal type identifier;

storing a type identifier which specifies said variable type defined by said string having said second syntax within said associated mapping table in association with said corresponding universal type identifier; and repeating said step of determining if said particular object file includes a string having said first syntax.

5. The method for constructing a compact executable program of claim 4, and further comprising:

in response to said determination that said particular object file does not include a string having said second syntax, identifying two or more mutually dependent strings which each define a variable type with reference to a variable type defined by another of said mutually dependent strings;

assigning a universal type identifier to each variable type within said mutually dependent strings;

storing each universal type identifier assigned in said assigning step within said associated mapping table in association with a corresponding type identifier; and repeating said step of determining if said particular object file includes a string having said second syntax.

6. The method for constructing a compact executable program of claim 5, wherein said step of assigning a universal type identifier comprises:

determining if assigning a particular combination of one or more of said universal type identifiers stored within said type table to said variable types within said mutually dependent strings would cause one of said mutually dependent strings to duplicate one of said strings stored within said type table that defines a variable type; and in response to said determination that assigning said particular combination of one or more universal types would cause one of said mutually dependent strings to duplicate one of said strings stored within said type table that defines a variable type, assigning said particular combination of universal type identifiers to said variable types within said mutually dependent strings.

7. The method for constructing a compact executable program of claim 1, wherein said strings each contain information utilized to debug said compact executable program.

8. A system within a data processing system for constructing a compact executable program, said system comprising:

means for identifying a plurality of object fixes to be linked together to construct said compact executable program, said plurality of object files each including one or more strings that define a variable type or associate a variable name with a variable type, wherein a selected variable type is uniquely specified within a particular object file utilizing a type identifier;

means for mapping each type identifier within each of said plurality of object files to a corresponding universal type identifier that uniquely specifies a selected variable type within all of said plurality of object files; and means for writing strings to said compact executable program which are not repeated in any two of said plurality of object files, wherein a number of strings written to said compact executable program is minimized.

9. The system for constructing a compact executable program of claim 8, wherein said means for mapping and writing operate on each of said plurality of object files individually.

10. The system for constructing a compact executable program of claim 9, wherein at least one variable type within one of said plurality of object files is a predefined variable type that is not defined in reference to other variable types within said one of said plurality of object files.

11. The system for constructing a compact executable program of claim 10, said system further comprising:

a plurality of mapping tables each associated with one of said plurality of object files, said plurality of mapping tables mapping type identifiers within an associated one of said plurality of object files to corresponding universal type identifiers;

a type table, wherein said type table stores a universal type identifier in association with a string that defines a variable type specified by that universal type identifier;

means for determining if said particular object file includes a string having a first syntax, wherein said string having a first syntax associates a variable name with only predefined variable types or variable types specified by type identifiers stored within a mapping table associated with said particular object file;

responsive to said determination that said particular object file includes a string having said first syntax,
- means for mapping to a corresponding universal type identifier each type identifier within said string having said first syntax;
- means for repeating said means for of determining if said particular object file includes a string having said first syntax;

means, responsive to said determination that said particular object file does not include a string having said first syntax, for determining if said particular object file includes a string having a second syntax, wherein said string having said second syntax defines a variable type with reference to only predefined variable types or variable types specified by type identifiers stored within said associated mapping table;

responsive to said determination that said particular object file includes a string having said second syntax,
- means for mapping to a corresponding universal type identifier each type identifier within said string having said second syntax;
- means for storing said string having said second syntax within said type table in association with a corresponding universal type identifier;
- means for storing a type identifier which specifies said variable type defined by said string having said second syntax within said associated mapping table in association with said corresponding universal type identifier; and
- means for repeating said means for of determining if said particular object file includes a string having said first syntax.

12. The system for constructing a compact executable program of claim 11, and further comprising:
means, responsive to said determination that said particular object file does not include a string having said second syntax, for identifying two or more mutually dependent strings which each define a variable type with reference to a variable type defined by another of said mutually dependent strings;

means for assigning a universal type identifier to each variable type within said mutually dependent strings;

means for storing each universal type identifier assigned in said assigning means for within said associated mapping table in association with a corresponding type identifier; and means for repeating said means for of determining if said particular object file includes a string having said second syntax.

13. The system for constructing a compact executable program of claim 12, wherein said means for assigning a universal type identifier comprises:

means for determining if assigning a particular combination of one or more of said universal type identifiers stored within said type table to said variable types within said mutually dependent strings would cause one of said mutually dependent strings to duplicate one of said strings stored within said type table that defines a variable type; and means, responsive to said determination that assigning said particular combination of one or more universal types would cause one of said mutually dependent strings to duplicate one of said strings stored within said type table that defines a variable type, for assigning said particular combination of universal type identifiers to said variable types within said mutually dependent strings.

14. The system for constructing a compact executable program of claim 8, wherein said strings each contain information utilized to debug said compact executable program.

* * * * *